(12) United States Patent
Flockhart et al.

(10) Patent No.: US 7,949,123 B1
(45) Date of Patent: *May 24, 2011

(54) WAIT TIME PREDICTOR FOR LONG SHELF-LIFE WORK

(75) Inventors: Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/000,686

(22) Filed: Nov. 30, 2004

Related U.S. Application Data

(60) Provisional application No. 60/614,153, filed on Sep. 28, 2004.

(51) Int. Cl.
*H04M 5/06* (2006.01)

(52) U.S. Cl. ......... 379/266.03; 379/265.02; 379/265.03; 379/265.06; 379/266.01; 379/266.07; 705/346; 718/104; 718/105

(58) Field of Classification Search .. 379/265.01–266.1; 705/1, 8, 11, 346; 718/104, 105
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,788,715 A | 11/1988 | Lee | |
| 4,797,911 A | 1/1989 | Szlam et al. | |
| 4,894,857 A | 1/1990 | Szlam et al. | |
| 4,953,204 A | 8/1990 | Cuschleg, Jr. et al. | |
| 5,001,710 A | 3/1991 | Gawrys et al. | |
| 5,025,468 A | 6/1991 | Sikand et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |

(Continued)

FOREIGN PATENT DOCUMENTS

CA 2143198 1/1995

(Continued)

OTHER PUBLICATIONS

Doo-Hyun Kim et al. "Collaborative Multimedia Middleware Architecture and Advanced Internet Call Center"; ProceedingsInternational Conference on Information Networking (Jan. 31, 2001), pp. 246-250.

(Continued)

*Primary Examiner* — Gerald Gauthier
(74) *Attorney, Agent, or Firm* — Sheridan Ross P.C.

(57) ABSTRACT

An architecture that is operable to predict when a selected work item will be serviced in a contact center 100 includes a service time predictor 260 operable to (a) select a plurality of successive time intervals, each of the plurality of time intervals recurring cyclically over a period of time; (b) determine a number of work items likely to be serviced during each of the plurality of time intervals; (c) select an enqueued work item waiting to be serviced, the enqueued work item having a corresponding queue position; and (d) predict a time interval of the plurality of time intervals in which the selected work item will be serviced by comparing the queue position of the selected work item with the number of work items likely to be serviced in at least some of the time intervals.

28 Claims, 5 Drawing Sheets

U.S. PATENT DOCUMENTS

| | | | |
|---|---|---|---|
| 5,185,780 A * | 2/1993 | Leggett | 379/265.08 |
| 5,206,903 A | 4/1993 | Kohler et al. | |
| 5,210,789 A | 5/1993 | Jeffus et al. | |
| 5,214,688 A | 5/1993 | Szlam et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A * | 4/1996 | Costantini et al. | 379/266.06 |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A | 11/1997 | Flockhart et al. | |
| 5,684,874 A | 11/1997 | Yagyu et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,793,861 A | 8/1998 | Haigh | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,012,144 A | 1/2000 | Pickett | |
| 6,021,428 A | 2/2000 | Miloslavsky | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,052,723 A | 4/2000 | Ginn | |
| 6,055,308 A | 4/2000 | Miloslavsky et al. | |
| 6,058,435 A | 5/2000 | Sassin et al. | |
| 6,064,730 A | 5/2000 | Ginsberg | |
| 6,064,731 A | 5/2000 | Flockhart et al. | |
| 6,084,954 A | 7/2000 | Harless | |
| 6,088,441 A | 7/2000 | Flockhart et al. | |
| 6,088,444 A | 7/2000 | Walker et al. | |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,182,059 B1 | 1/2001 | Angotti et al. | |
| 6,185,292 B1 | 2/2001 | Miloslavsky | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,066 B1 | 7/2001 | Shtivelman et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | |
| 6,353,810 B1 | 3/2002 | Petrushin | |
| 6,356,632 B1 | 3/2002 | Foster et al. | |
| 6,366,668 B1 | 4/2002 | Borst et al. | |
| 6,389,028 B1 * | 5/2002 | Bondarenko et al. | 370/401 |
| 6,389,132 B1 | 5/2002 | Price | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,294 B1 | 3/2003 | Arledge, Jr. et al. | |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |

| | | | |
|---|---|---|---|
| 6,563,920 | B1 | 5/2003 | Flockhart et al. |
| 6,574,329 | B2 * | 6/2003 | Takeuchi et al. ............... 379/242 |
| 6,597,685 | B2 | 7/2003 | Miloslavsky et al. |
| 6,614,903 | B1 | 9/2003 | Flockhart et al. |
| 6,650,748 | B1 | 11/2003 | Edwards et al. |
| 6,697,457 | B2 | 2/2004 | Petrushin |
| 6,704,409 | B1 | 3/2004 | Dilip et al. |
| 6,707,903 | B2 | 3/2004 | Burok et al. |
| 6,714,643 | B1 * | 3/2004 | Gargeya et al. .......... 379/266.06 |
| 6,741,699 | B1 | 5/2004 | Flockhart et al. |
| 6,754,333 | B1 * | 6/2004 | Flockhart et al. ........ 379/266.01 |
| 6,775,378 | B1 * | 8/2004 | Villena et al. ............ 379/266.07 |
| 6,853,721 | B2 * | 2/2005 | Mengshoel et al. ..... 379/265.06 |
| 6,947,543 | B2 | 9/2005 | Alvarado et al. |
| 7,035,927 | B2 | 4/2006 | Flockhart et al. |
| 7,158,628 | B2 * | 1/2007 | McConnell et al. ..... 379/265.02 |
| 7,336,779 | B2 * | 2/2008 | Boyer et al. ............. 379/265.02 |
| 7,386,113 | B2 * | 6/2008 | Galvin ..................... 379/265.03 |
| 7,386,850 | B2 * | 6/2008 | Mullen ......................... 718/104 |
| 7,415,417 | B2 * | 8/2008 | Boyer et al. .................. 705/346 |
| 7,657,021 | B2 * | 2/2010 | Flockhart et al. ........ 379/266.01 |
| 7,770,175 | B2 * | 8/2010 | Flockhart et al. ............. 718/105 |
| 7,844,504 | B1 * | 11/2010 | Flockhart et al. ........ 379/266.02 |
| 2002/0018554 | A1 * | 2/2002 | Jensen et al. ............. 379/265.01 |
| 2002/0118816 | A1 * | 8/2002 | Flockhart et al. ........ 379/265.12 |
| 2002/0181692 | A1 * | 12/2002 | Flockhart et al. ........ 379/265.02 |
| 2002/0194002 | A1 | 12/2002 | Petrushin |
| 2003/0174830 | A1 | 9/2003 | Boyer et al. |
| 2003/0177017 | A1 * | 9/2003 | Boyer et al. ....................... 705/1 |
| 2004/0203878 | A1 | 10/2004 | Thomson |
| 2005/0071211 | A1 * | 3/2005 | Flockhart et al. ................. 705/8 |
| 2007/0071222 | A1 * | 3/2007 | Flockhart et al. ........ 379/265.02 |
| 2007/0230681 | A1 * | 10/2007 | Boyer et al. ............... 379/265.1 |
| 2008/0275751 | A1 * | 11/2008 | Flockhart et al. ................. 705/8 |
| 2008/0275752 | A1 * | 11/2008 | Flockhart et al. ................. 705/8 |
| 2008/0275766 | A1 * | 11/2008 | Flockhart et al. ............... 705/11 |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0 829 996 A2 | 3/1998 |
| EP | 0855826 | 7/1998 |
| EP | 0 866 407 A1 | 9/1998 |
| EP | 0863651 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| JP | 07-134743 | 5/1995 |
| JP | 10-173780 | 6/1998 |
| JP | 10-304073 | 11/1998 |
| JP | 10-304074 | 11/1998 |
| JP | 11-017806 | 1/1999 |
| JP | 11-163860 | 6/1999 |
| JP | 11-514515 | 12/1999 |
| JP | 2000-092213 | 3/2000 |
| WO | WO 96/07141 | 3/1996 |
| WO | WO 97/28635 | 8/1997 |
| WO | WO 98/56207 | 12/1998 |
| WO | WO 99/65214 | 12/1999 |
| WO | WO 01/17215 | 3/2001 |

OTHER PUBLICATIONS

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Avaya, Inc. Business Advocate Options, at http://www.avaya.com, downloaded on Feb. 15, 2003, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

Foster, Robin, et al., "Avaya Business Advocate and its Relationship to Multi-Site Load Balancing Applications," Avaya, Inc., Mar. 2002, 14 pages.

GEOTEL Communications Corporation Web site printout entitled "Intelligent CallRouter" Optimizing the Interaction Between Customers and Answering Resources., 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Background of the Invention for the above-captioned application (previously provided).

U.S. Appl. No. 09/669,486, filed Sep. 25, 2000, Flockhart et al.

* cited by examiner

| 604a | 604b | 604c | 604d | 604e | 604f | 604g | 604h | 604i | 604j | 604k |
|---|---|---|---|---|---|---|---|---|---|---|
| TU | W | TH | F | SAT | SUN | M | TU | W | TH | F |
| 21 | 18 | 22 | 16 | 0 | 0 | 18 | 21 | 18 | 22 | 16 |
| 608a | 608b | 608c | 608d | 608e | 608f | 608g | 608h | 608i | 608j | 608k |

| 704a | 704b | 704c | 704d | 704e | 704f | 704g | 704h | 704i | 704j | 704k |
|---|---|---|---|---|---|---|---|---|---|---|
| TU | W | TH | F | SAT | SUN | M | TU | W | TH | F |
| Y | Y | Y | Y | N | N | N | Y | Y | Y | Y |
| 708a | 708b | 708c | 708d | 708e | 708f | 708g | 708h | 708i | 708j | 708k |

| 804a | 804b | 804c | 804d | 804e | 804f | 804g | 804h | 804i | 804j | 804k |
|---|---|---|---|---|---|---|---|---|---|---|
| TU | W | TH | F | SAT | SUN | M | TU | W | TH | F |
| 21 | 18 | 22 | 16 | 0 | 0 | 0 | 21 | 18 | 22 | 16 |
| 808a | 808b | 808c | 808d | 808e | 808f | 808g | 808h | 808i | 808j | 808k |

| M | TU | W | TH | F | Sat | Sun |
|---|---|---|---|---|---|---|
| 18 | 21 | 18 | 22 | 16 | 0 | 0 |

1000

| TH | F | Sat | Sun | M | TU | W | TH | F | Sat |
|---|---|---|---|---|---|---|---|---|---|
| 22 | 16 | 0 | 0 | 0 | 21 | 18 | 22 | 16 | 0 |

1100

WAIT TIME PREDICTOR FOR LONG SHELF-LIFE WORK

CROSS REFERENCE TO RELATED APPLICATION

This application claims the benefits under 35 U.S.C. §119 of U.S. Provisional Patent Application Ser. No. 60/614,153, filed Sep. 28, 2004, of the same title and to the same inventors, which is incorporated herein by this reference. Cross reference is made to U.S. patent application Ser. No. 09/641,403, filed Aug. 17, 2000, entitled "Wait Time Prediction Arrangement for Non-Real-Time Customer Contacts", which is incorporated herein by this reference.

FIELD OF THE INVENTION

The present invention relates generally to techniques for estimating customer wait times in customer contact systems and specifically to techniques for estimating wait times for non-real-time customer contacts.

BACKGROUND OF THE INVENTION

In customer contact systems or use centers, calls incoming to a call center are answered and handled by a plurality of agents. The system automatically distributes and connects incoming calls to whatever agents are suited to handling the calls and are free, i.e., not handling other calls at the moment. As used herein, a "call" or "contact" refers to any mode or type of contact between two entities, including without limitation voice calls, VoIP, text-chat, e-mail, fax, electronic documents, webforms, voice messages, and video calls, to name but a few.

A system frequently becomes overloaded when no suitable agents are available to handle calls when the calls come in. The calls are placed in different queues based upon some preestablished criteria and are placed in each queue in the order of their arrival and/or priority. Each call in each queue is then delivered to an agent in a grouping of agents (corresponding to the queue containing the call) for servicing based on the position of the call in the queue.

Information on how long either an individual or an average caller has to wait to have his or her call serviced is important information for the service provider. It is often the most important factor for deciding how to treat the call and how to staff agent groups to meet selected contact center service level and thus serves as a crucial tool for customizing customer service. Service levels measure the degree to which a corresponding contact center goal is being attained or not attained.

Numerous techniques have been developed over time to estimate a call's wait-time in queue. One estimation technique uses the average wait time to answer calls that have been placed in queue. Another estimation technique uses the wait time of the oldest call in the queue. Yet another estimation technique uses, as the wait-time estimate, the number of calls in the queue multiplied by the average time it takes an agent to handle a call, divided by the number of agents available to handle the calls. Yet another estimation technique is known as weighted advanced time (WAT), which is an exponential moving average based on the Average Advanced Time (AAT) of each individual call in queue. This approach is described in U.S. Pat. No. 5,506,898, which is incorporated herein by this reference.

These predictive techniques have been optimized for real-time contacts but can be inaccurate when applied to non-real-time contacts. As used herein, real-time contacts refer to contacts in which the contacting entity or customer is present during the waiting (or queuing) period and can choose to abandon or disconnect the contact if the call is not serviced within an acceptable period. Common examples include voice calls, VoIP, text-chat, video calls, and the like. Non-real-time contacts refer to contacts in which the contacting entity or customer is unable to abandon or disconnect the contact. Common examples include e-mail, fax, electronic or paper documents, webform submissions, voice messages, and the like. For example, non-real-time contacts may stay in queue overnight or over a weekend or holiday when the contact center is unstaffed. When the contact is serviced, the time to advance one position in the queue for the contact may be exceptionally large. The above-predictive techniques may be skewed by such excessive advance times and cause work distribution to be handled inefficiently and/or ineffectively.

Copending U.S. application Ser. No. 09/641,403, filed Aug. 17, 2000, entitled "Wait Time Prediction Arrangement for Non-Real-Time Customer Contacts", discloses a technique to effect service time prediction for non-real-time contacts. This technique has been incorporated in Avaya Inc.'s Interaction Center™ product which has been available commercially for over one year. When a contact is enqueued following the occurrence of a selected event, namely the queue has no working agents (e.g., the switching center (or call or contact center) is unstaffed); the queue is empty (e.g., the contact center has idle working agents); the contact center (or call or switching center) is not operational (e.g., the contact center is shut down or is otherwise out of service); a working agent of the contact center elects not to service the item (e.g., the rules governing the servicing of items permits the next available working agent to defer or decline servicing the item); and/or a system clock is changed (such as by an administrator or otherwise) that is accessed by the contact center for timing information, the ensuing time interval, advance time, or other type of timing information associated with the first item is excluded from an estimation of a wait time (e.g., WAT, etc.) associated with the queue. The wait time can be determined using any suitable techniques, including those described above.

Although this algorithm represents a substantial step forward from prior contact center algorithms for predicting wait time for non-real-time contacts, it can be unable to provide an accurate estimate of wait time when the wait-time period crosses one or more unstaffed time intervals. A wait time predictor is needed that can accurately predict when an item of work will be serviced, even when that work may remain in queue during unstaffed periods such as holidays and weekends.

SUMMARY OF THE INVENTION

These and other needs are addressed by the various embodiments and configurations of the present invention. The present invention is directed generally to an architecture for predicting queue wait times that divides a selected recurring work period into a plurality of time intervals, determines a projected number of work items serviced during each time interval, and, based on the projected number of work items, predicts, for a selected queue position, a future time interval in which the work item corresponding to the selected queue position will be serviced. The time interval may be any suitable time frame, such as a 15-minute interval, a 30-minute interval, an hour-long interval, a half-day interval, and an interval that is a full day or longer. The work item can be any item of work for a contact center resource, such as a real-time contact, a non-real-time contact, and/or back office work. The architecture is particularly advantageous for automatic call distribution (ACD) systems. The prediction may be made at any time before or while the work item is in queue. The architecture normally performs the estimated service time prediction separately and individually for each separate call queue. The architecture can take into consideration the effect of ACD features that affect the predicted service time, including changes in the numbers of agents that are serving the queue due to agent login and logout.

In one embodiment, a method for predicting when a selected work item will be serviced in a contact center includes the steps of:

(a) selecting a first time interval, the first time interval recurring cyclically over a period of time;

(b) determining a first number of work items serviced by the contact center during a first occurrence of the first time interval;

(c) determining a second number of work items serviced by the contact center during a second occurrence of the first time interval;

(d) determining, based on the first and second numbers of work items, a projected number of work items likely to be serviced during a future occurrence of the first time interval; and (e) based on the projected number of work items, determining whether a selected work item will be serviced during the future occurrence of the first time interval. The cyclic occurrence of the first and second time intervals can be illustrated by a simple example. If the selected time interval is the period from 9:00 am to 9:30 am on Monday morning, the time interval will recur once each week. As will be appreciated, the time interval can be of any length but is typically a subpart of a week.

The projected number of work items is typically a weighted or unweighted exponential moving average of the first and second numbers. The preferred algorithm for determining the projected number of work items is as follows:

$$AWS_{NEW} = (X * AWS_{OLD}) + ((1-X) * WS_{SELECTED\ TIME\ INTERVAL})$$

where $AWS_{NEW}$ is a new average number of work items to be serviced during the first time interval, X is weighting factor having a value less than or equal to one, $AWS_{OLD}$ is an old average number of work items to be serviced during the first time interval, and $WS_{SELECTED\ TIME\ INTERVAL}$ is the number of work items serviced during the second occurrence of the first time interval. As will be appreciated, the projected number of work items can be derived by a myriad of other algorithms known to those of ordinary skill in the art.

By using cyclically recurring time intervals as the basis of the service time projections, expected or administered service-impacting events can be considered in the projection. For example, a business holiday or weekend that will cause enqueued items not to be serviced can be reflected by setting the projected number of work items to be serviced during the next occurrence of the impacted time intervals to zero. Likewise, expected staffing level increases or decreases below the normal level can be reflected by a multiplier applied to the number of work items to be serviced during the next occurrence of the impacted time intervals.

The method further can accommodate abnormal or unexpected events. For example, where an abnormal or unexpected event such as a power outage or equipment malfunction or blizzard occurs that causes one or more queues not to be serviced or to be serviced at an abnormally low level, the number of items serviced during the impacted time intervals can be ignored in the calculation of the projected number of work items to be serviced during the next occurrence of those time intervals.

In yet another embodiment of the present invention, a method for predicting when a selected work item will be serviced in a contact center includes the steps of:

(a) selecting a plurality of successive time intervals, each of the plurality of time intervals recurring cyclically over a period of time;

(b) determining a number of work items likely to be serviced during each of the plurality of time intervals;

(c) selecting an enqueued work item waiting to be serviced, the enqueued work item having a corresponding queue position; and (d) predicting a time interval of the plurality of time intervals in which the selected work item will be serviced by comparing the queue position of the selected work item with the number of work items likely to be serviced in one or more of the time intervals.

This methodology can have numerous advantages. For example, the present invention can provide an effective technique for providing accurate wait-time predictions for work items such as non-real-time contacts. Because service levels during recurring time intervals are normally fairly constant, the method can accurately predict the wait-time of a non-real-time contact when a wait period will span one or more periods that are unstaffed or staffed at a different level, such as when the wait time spans overnight, a weekend or holiday, or an evening or night shift with significantly reduced numbers of staff. Conventional service time predictors are accurate only for contacts that will be serviced during the current staffed period. The provision of accurate service time predictions for non-real-time customer contacts can provide improved customer satisfaction and retention levels. It may further reduce costs, as customers are often willing to wait a significantly longer time to receive a response when they are given a clear indication of when the response will be provided. It may also reduce costs by converting voice calling customers to other less expensive media channels such as email. These predictions can be used for multi-site load balancing or for alternate treatment when the wait times are too long. By tracking historic time-interval service levels, the present invention can also flag service trend changes, whether positive or negative, to contact center management and permit staffing reconfiguration to use positive trends and early diagnosis and correction of negative trends. The present invention can provide these benefits using a relatively simple mathematical equation to make the service time projections and thereby conserve valuable processing resources and facilitate contact center administration of the algorithm variables.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements.

Those skilled in the art will recognize that the disclosed techniques may be used in any communication application in which it is desirable to provide improved contact processing.

Figure 1:
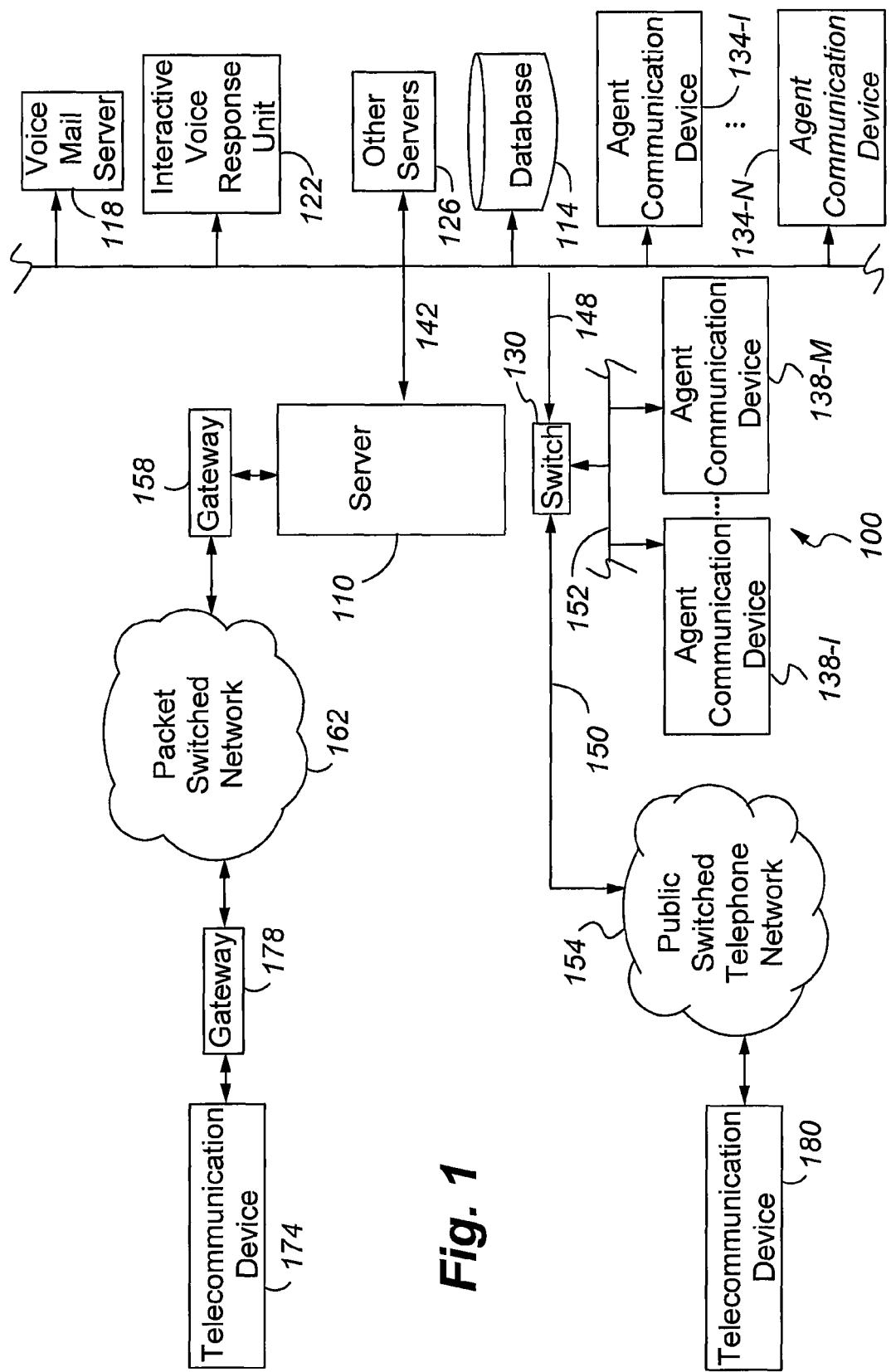
FIG. 1 is a block diagram of a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be Avaya Inc.'s, G700™, G600™ MCC/SCC™ media gateway and may be implemented as hardware such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
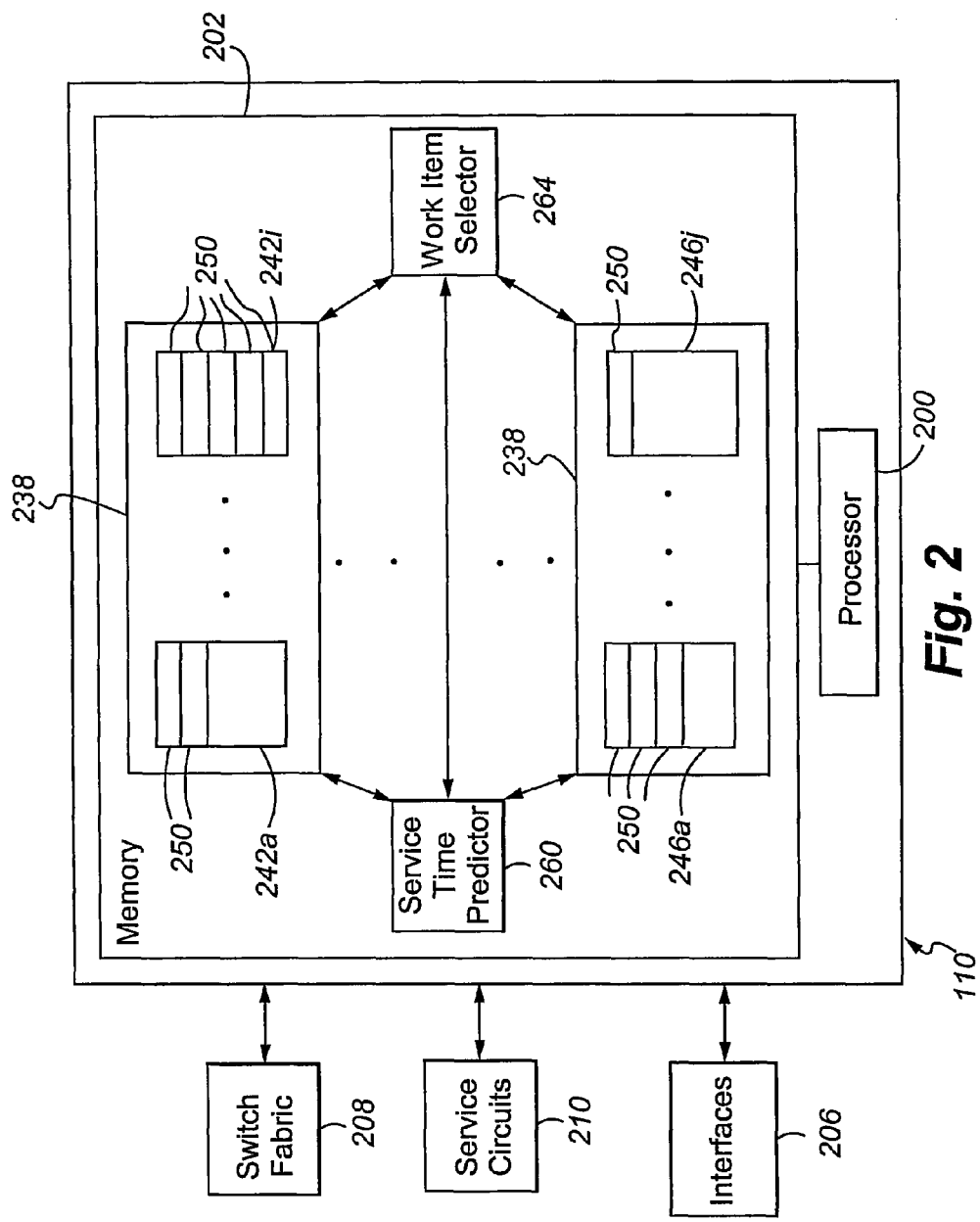
FIG. 2 is a block diagram of a server according to an embodiment of the present invention.

Referring to FIG. 2, one possible configuration of the server 110 is depicted. The server 110 in this implementation includes a processor 200, a memory 202, one or more interfaces 206 to other devices such as switch 130, gateway 158, voice mail server 118, IVR 122, and communication devices 134 and 138, a switch fabric 208, and a set of service circuits 210. The processor 200 may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The memory 202 includes a plurality of sets 238 of call queues 242 and 246. Each set 238 of call queues 242*a-i* and 246*a-j* conventionally serves and holds work items (e.g., contacts) for a different work type and/or for real- versus non-real-time contacts. In the depicted embodiment, queues 242*a-i* serve non-real-time contacts while queues 246*a-j* serve real-time contacts. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness. Within each set 238 of queues 242 and 246, each queue holds contacts of a different priority and/or different type (e.g., e-mail, fax, electronic or paper documents, webform submissions, voice messages, voice calls, VoIP calls, text chat, video calls, and the like). The priority of a contact is determined according to well known predefined criteria. Each queue 242 and 246 normally functions as a first-in, first-out (FIFO) buffer memory, and includes a plurality of entries, or positions 250, each for identifying a corresponding enqueued contact. The position 250 at the head of the queue is considered to be position 1, the next subsequent position 250 to be position number 2, and so forth.

The processor 200 operating in conjunction with the memory 202 executes one or more software programs depicted in FIG. 2 as the service time predictor 260 and work item selector 264.

The service time predictor 260 performs service time prediction for both real-time and non-real-time contacts.

Real-time service prediction is conventional in that, for each contact at the head of a queue, it determines, a current or oldest wait time or CWT, the weighted average advance time WAT, the expected wait time EWT, and/or the predicted wait time PWT (which is the sum of the CWT and WAT). These predictive techniques are described in U.S. Pat. No. 5,506, 898, which is incorporated herein by this reference.

Non-real-time service prediction is effected using an exponential moving average of the number work items serviced (also referred to as AWS) during each of a plurality of time intervals contained in a selected period of time. For example, a business week can be broken down into 30-minute time intervals. The exponential moving average is the number of work items (or WS) serviced during each 30-minute interval. Each queue has a respective exponential moving average for each time interval. As each time interval expires, the exponential moving average is adjusted using the number of work items that were just serviced during the period. The AWS values for each time interval are maintained for each queue in a combined or separate AWS and/or predicted service time table. Business hours, holidays, early closings, planned service interruptions, queue staffing level changes, and the like are administered by the contact center and maintained in a business time (BT) table. Periodically (daily or per period), the AWS and BT tables are jointly processed to generate a predicted service time table (PST table) providing the predicted number of work items that will be serviced in each successive time interval beginning from the present time and covering a configurable time period. The time period is preferably at least as long as the longest expected wait time for the corresponding queue. More preferably, the PST table covers a time period of several days or weeks. Providing a prediction for any given work item involves taking the work item's current position in queue and subtracting the predicted number of work items serviced in each successive time interval. The time interval for which the result of the subtraction goes negative is the time interval within which the selected work item is predicted to be serviced.

The work item selector 264 assigns enqueued work items to agents by any suitable criteria known to those of ordinary skill in the art. For example, the selector 264 can select the work item at the head of the queue for servicing by the next available agent in the grouping of agents servicing the queue. Where one agent grouping is servicing multiple queues or an agent is included simultaneously within several agent groupings, other criteria can be used for selecting between two or more work items in separate queues. For example, the servicing priority of the queue or work item, attainment or non-attainment of goals for each queue, the service level(s) for each queue, and the like may be used to select for servicing one item from one queue over a second item from another queue. When the server 110 forwards a voice contact to an agent, the server 110 also forwards customer-related information from databases 114 to the agent's computer work station for viewing (such as by a pop-up display) to permit the agent to better serve the customer.

The service circuits 210 may include tone generators, announcement circuits, etc. These circuits and the interfaces 206 are controlled by processor 200 in implementing call processing functions in the server 110.

The server 110 may include additional elements that are omitted from FIG. 2 for simplicity and clarity of illustration. For example, the server may include a port card for each type of user terminal associated therewith. In addition, it will be appreciated by those skilled in the art that the server 110 may be configured to support multiple user terminals of different types, e.g., wired desk set terminals, wireless desk set terminals, personal computers, video telephones or other advanced terminals, etc.

Also associated with the server 110 may be an administrator terminal (not shown) which is used to program the operation of the server 110 during a system administration, e.g., an initial set-up and configuration of the system or a subsequent system-level or user-level configuration.

Other devices not shown in the figures may be associated with the server 110, such as an adjunct feature server. Such an adjunct may be physically incorporated within the server and may be partially or completely implemented using other server elements such as processor 200 and memory 202.

Figure 4:
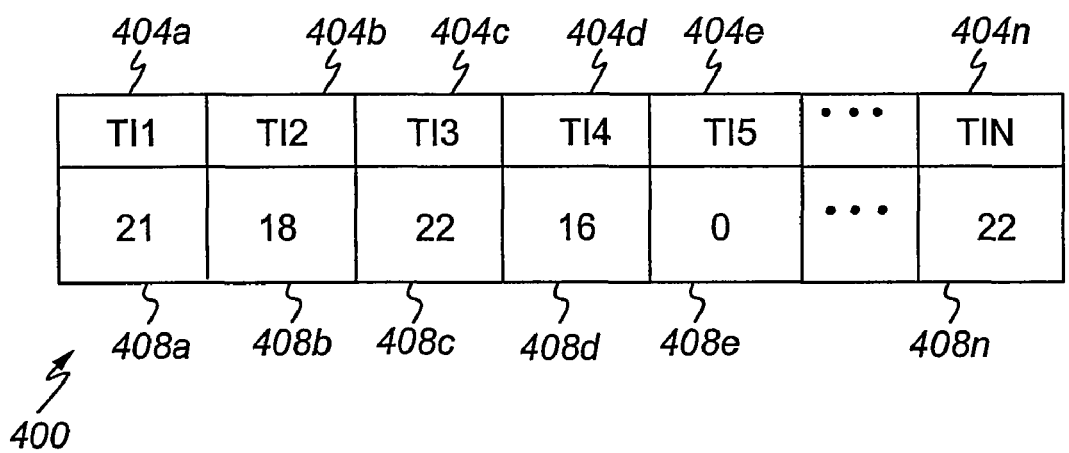
FIG. 4 is an average work items serviced table according to an embodiment of the present invention.

A data structure used by the predictor 260 is shown in FIG. 4. The data structure is an Average Work items serviced (AWT) table 400 of AWS values for N selected time intervals 404*a-n*. The time interval typically is a relatively short time period of about 15 to 60 minutes in length but can be longer or shorter in length depending on the application. The individual AWS values 408*a-n* are listed below the corresponding time interval identifier. For example, the AWS value 408*a* for the first time interval 404*a* is 21, and the AWS value 408*b* for the second time interval 404*b* is 18. Typically, a separate AWS table is maintained for each day of the week and for each queue. The N number of time intervals represents the time intervals during a calendar week. For example, if each time interval is a day there would be seven time intervals in total in the table 400.

The operation of the service time predictor for non-real-time contacts will now be discussed with reference to FIGS. 3-11.

The adjustment of the exponential moving average of the number of work items serviced from a queue during a time interval will first be discussed with reference to FIG. 3. The figure assumes that the selected time interval is over and the AWS value for the completed time interval needs to be determined.

In decision diamond 300, the predictor 260 determines whether the serviced work item counter (WS) is greater than zero. For each queue, the predictor 260 maintains a count using the WS counter of the number of work items serviced from the queue during each time interval. The WS counter is preferably incremented but can be decremented from a selected value, such as zero (in which case the WS counter has a negative value) or a nonzero whole integer (in which case the WS counter value approaches zero). Each time a work item is serviced, the counter is adjusted appropriately to reflect the servicing of an additional work item.

When the value of WS is nonzero, the predictor 260 proceeds to step 304 in which the AWS value for the selected time interval is adjusted using the following equation:

$$AWS_{NEW} = (X * AWS_{OLD}) + ((1-X) * WS_{SELECTED\ TIME\ INTERVAL})$$

where $AWS_{NEW}$ is the new exponential moving value for queue and the selected time interval, X is weighting factor having a value less than one, $AWS_{OLD}$ is the old exponential moving value for the queue and prior occurrence of the selected time interval (before the selected time interval expires), and $WS_{SELECTED\ TIME\ INTERVAL}$ is the value of the WS counter for the selected time interval (or the number of work items serviced during the selected time interval). By way of example, X may be set to a value such as 0.64. This value will result in about 90% of the value of $AWS_{NEW}$ being obtained from the results of the WS values for the last five occurrences of the selected intervals. If the selected time interval is from 9:00 am to 9:30 am on Monday, 90% of the value of $AWS_{NEW}$ is obtained from the WS values for the last five Mondays for the interval from 9:00 am to 9:30 am.

After determining the value of $AWS_{NEW}$, the predictor 260 updates the AWS table 400 accordingly and, in step 308, sets the value of the WS counter to zero for the next or subsequent time interval.

When the value of WS is zero, the predictor 260 proceeds to step 308. The value of AWS is not adjusted for inactive time intervals; AWS is an average for active time intervals only.

Figures 5, 6, 7, 8:
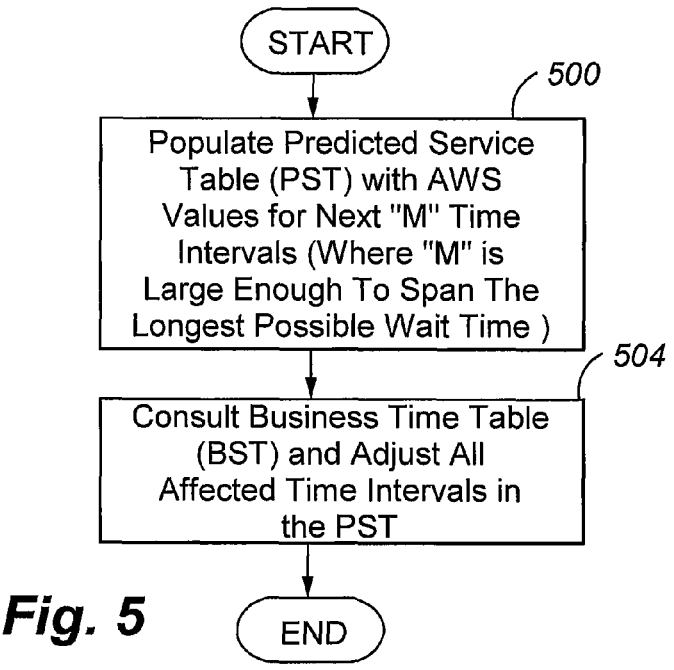
FIG. 5 is a flowchart of the operation of the service time predictor according to an embodiment of the present invention.
FIG. 6 is a predicted service (PS) table according to an embodiment of the present invention.
FIG. 7 is a business time (BT) table according to an embodiment of the present invention.
FIG. 8 is an adjusted PS table according to an embodiment of the present invention.

With reference to FIG. 5, the process for populating the PST table is discussed.

Figure 3:
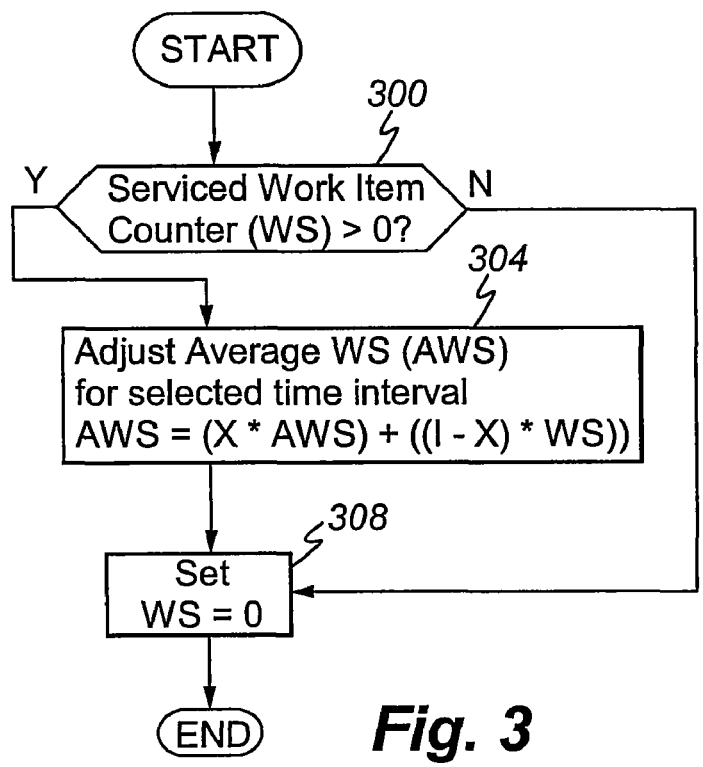
FIG. 3 is a flowchart of the operation of a service time predictor according to an embodiment of the present invention.

In step 500, the PST table 600 is populated using the process of FIG. 3. The population is performed for the next "M" time intervals, with "M" having a value that is large enough to span the longest possible wait time for the corresponding queue. At the end of each time interval, a new PST table 600 for each queue is constructed.

Compared to the AWT table 400, the PST table 600 may have more or less total time interval entries depending on the value of "M". If the longest possible wait time for the corresponding queue is less than a week, the PST table 600 will have fewer time interval entries than the AWT table 400. If the longest possible wait time is more than a week, the PST table 600 will have more time interval entries than the AWT table 400.

In step 504, the business time (BT) table 700 is consulted and all affected time intervals in the PST table 600 adjusted to reflect business staffing events, such as business hours, holidays, early closings, planned service interruptions, queue staffing level changes, and the like. The revised PST table 600 can then be used for service time predictions.

An example of these steps will now be discussed with reference to FIGS. 6-8. Referring to FIG. 6 (which is an example of the PST table 600), the PST table 600 has the upcoming time intervals with the AWS values populated in each entry. The table 600 is based on the assumptions that the time interval is one day and that the longest wait time for the queue will not exceed ten days. FIG. 6 further assumes that the time interval for Monday has just concluded and that for Tuesday has begun or is about to begin. The table 600 includes the time interval identifier 604a-k and, for each identifier 604a-k, the corresponding AWS value 608a-k. With reference to FIG. 7, the BT table 700 includes, for each time interval identifier 704a-k shown as being a corresponding staffing indicator 708a-k. Although the staffing indicator 708a-k is shown as being a binary variable (e.g., "Y" meaning staffed and "N" meaning unstaffed), it is to be appreciated that the indicator 708 can be in other forms, such as a numerical value representing a fraction of a selected staffing level. For example, the value "1" (or 100%) can correspond to a selected staffing level, a value less than one to a level of staffing below the selected staffing level (or a percentage staffing less than 100%), and a value greater than one to a staffing level above the selected staffing level (or a percentage staffing more than 100%). A value of zero means that the queue is not staffed. The number can be multiplied against the AWS value for the corresponding interval to yield the expected WS value for the time interval. In this way, known staffing level increases and reductions can be reflected to cope with special situations.

In step 504, the BT table 700 is consulted to determine whether any time interval(s) will be out of business hours. The table 700 indicates that Monday is a holiday. The PST table 600 is adjusted to yield the revised PST table 800 of FIG. 8. The AWS value 808g for the Monday time interval 804g is set to zero rather than 18 as shown in FIG. 6.

Figures 9, 10, 11:
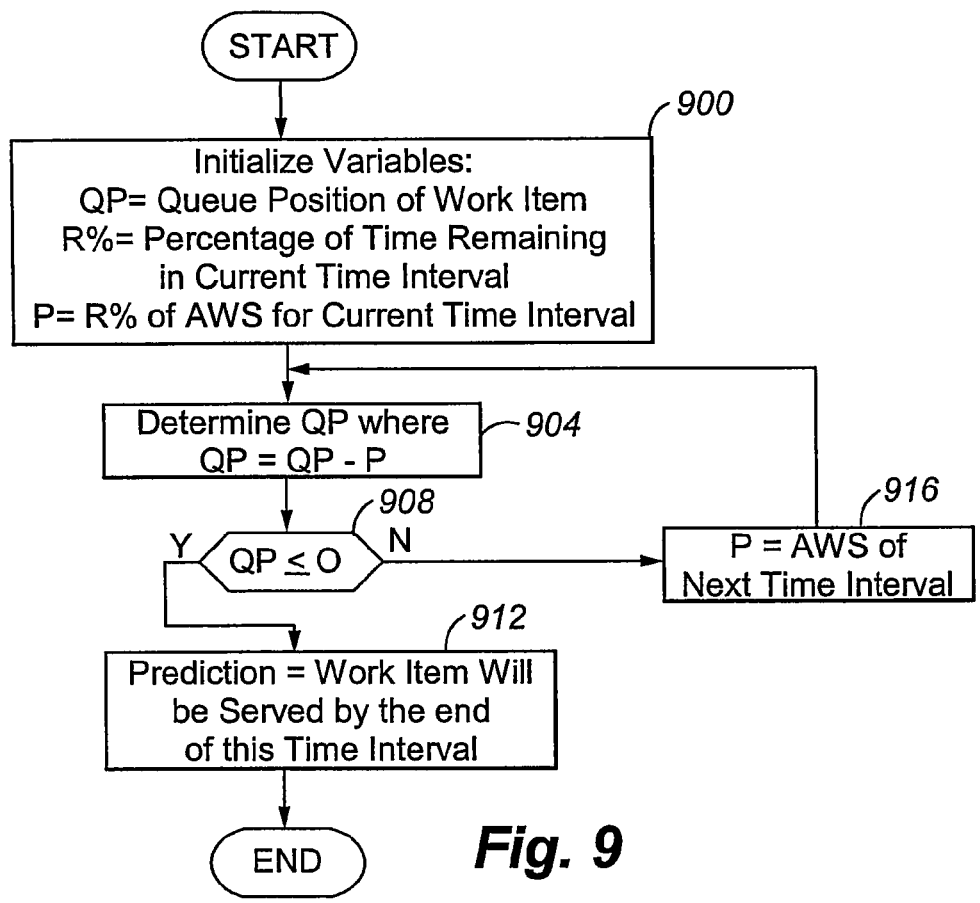
FIG. 9 is a flowchart of the operation of the service time predictor according to an embodiment of the present invention.
FIG. 10 is an AWS table according to an embodiment of the present invention.
FIG. 11 is a PS table according to an embodiment of the present invention.

The process for making a prediction will now be discussed with reference to FIG. 9.

As will be appreciated, wait time predictions can be made for any queued work item at any time or for a new work item that may be placed in a queue.

In step 900, the predictor 260 initializes a number of variables, including QP which is set to the queue position of the selected work item (for which the prediction is to be made), R % which is set to the percentage of time remaining in the current time interval, and P which is set to R % of the AWS value for the current time interval.

In step 904, the predictor 260 determines the queue position immediately before the next succeeding time interval (or $QP_{NEXT\ TIME\ INTERVAL}$) using the following equation:

$$QP_{NEXT\ TIME\ INTERVAL} = QP_{CURRENT\ TIME\ INTERVAL} - P,$$

where $QP_{CURRENT\ TIME\ INTERVAL}$ is the current queue position of the selected work item.

In decision diamond 908, the predictor 260 determines whether $QP_{NEXT\ TIME\ INTERVAL}$ is less than or equal to zero. If so, the predictor 260 proceeds to step 912 and determines that the predicted service time is by the end of the current time interval. If not, the predictor 260 proceeds to step 916 and sets P equal to the AWS value of the next time interval and returns to and repeats step 904. This process is repeated iteratively until the value of $QP_{NEXT\ TIME\ INTERVAL}$ is less than or equal to zero.

An example will now be discussed to demonstrate the predictive process. FIG. 10 is an AWT table 1000, and FIG. 11 is an adjusted PST table 1100. Assume that R % is 50% through the current time interval (which is Thursday), that the time interval is one day, that Monday is a holiday, that the contact center is not staffed over the weekend, and that the current queue position of the selected work item is 60. In steps 904, 908, and 916, the following iterations will be performed using the equation of step 904:

| TH  | 60 − (50% of 22) = 49 | First Iteration   |
|-----|-----------------------|-------------------|
| F   | 49 − 16 = 33          | Second Iteration  |
| SAT | 33 − 0 = 33           | Third Iteration   |
| SUN | 33 − 0 = 33           | Fourth Iteration  |
| M   | 33 − 0 = 33           | Fifth Iteration   |
| TU  | 33 − 21 = 12          | Sixth Iteration   |
| W   | 12 − 18 = −6          | Seventh Iteration |

Based on the above, the selected work item will be serviced by the close of business on Wednesday.

A number of variations and modifications of the invention can be used. It would be possible to provide for some features of the invention without providing others.

For example in one alternative embodiment, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

In another alternative embodiment, rather than constructing a first PST table from the AWS table the BT table could be considered when the PST table is initially constructed after the expiration of each time interval.

In a further alternative embodiment, a filter is used to discard WS values that are less than or exceed a determined standard deviation or range relative to the AWS value for the time interval. For example, the filter could discard in step 304 any WS value that is less than 50% of the AWS value or more than 150% of the AWS value. The rejection could be effected in step 300 by performing step 304 only when the WS counter value is nonzero and has a value within a selected range or standard deviation of the current AWS value for the selected interval.

In another alternative embodiment, the PST table can be configured as an accumulator in which each time interval has a total number of work items to be serviced relative to a selected point in time. In other words, if in a first time interval a first number of work items is expected to be serviced, the next succeeding second time interval would be a total of the first number and a second number of work items expected to be serviced in the second time interval. For a selected queue position, a binary search could be performed to determine the time interval in which the work item will be serviced.

In yet other embodiments, the AWS table can be based on a cyclic period other than a week. The cyclic period can be a portion of a week or a multiple of weeks depending on the application.

In yet another embodiment, the techniques of the present invention are used for real-time contacts.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) a processor determining a plurality of time intervals for a selected period of time, wherein the selected period of time recurs cyclically;
   (b) the processor selecting a first time interval of the plurality of time intervals in the selected period of time;
   (c) the processor determining a first number of work items serviced by the contact center during a first occurrence of the first time interval in a first occurrence of the selected period of time;
   (d) the processor determining a second number of work items serviced by the contact center during a second occurrence of the first time interval in a second occurrence of the selected period of time;
   (e) the processor determining, based on the first and second numbers of work items, a projected number of work items likely to be serviced during a future occurrence of the first time interval in a future occurrence of the selected period of time;
   (f) the processor repeating steps (b)-(e) for a second time interval of the plurality of time intervals in the selected period of time, wherein the second time interval is different from the first time interval; and
   (g) based on the projected number of work items to be serviced in at least one future occurrence of the first time interval and the second time interval, the processor determining when a selected work item will be serviced.

2. The method of claim 1, wherein the work items are non-real-time contacts, wherein the work items are serviced by human agents, wherein the projected number is an average of the first and second numbers, wherein a first level of human agent staffing during the first time interval is different from a second level of human agent staffing during the second time interval, and wherein each of the first and second numbers of work items is nonzero.

3. The method of claim 1, wherein the selected work item is in a queue, wherein the first occurrence of the first time interval precedes the second occurrence of the first time interval, wherein the projected number is an average of the first and second numbers, and wherein in the determining step (e) the average is determined using the following equation:

$$AWS_{NEW} = (X*AWS_{OLD}) + ((1-X)*WS_{SELECTED\ TIME\ INTERVAL})$$

where $AWS_{NEW}$ is a new average number of work items to be serviced during the first time interval, X is a weighting factor having a value less than or equal to one, $AWS_{OLD}$ is an old average number of work items to be serviced during the first time interval, and $WS_{SELECTED\ TIME\ INTERVAL}$ is the number of work items serviced during the second occurrence of the first time interval.

4. The method of claim 1, wherein the projected number is an average of the first and second numbers, wherein the first time interval and other time intervals define a plurality of successive time intervals, each of the successive time intervals having a corresponding average number of work items serviced during the respective time interval, wherein the selected work item has a corresponding queue position, and wherein determining step (g) comprises:

adjusting at least some of the average numbers of work items for at least some of the successive time intervals to zero to reflect an idle contact center period in which no work items are serviced, the at least some of the successive time intervals falling within the idle contact period; and after the adjusting step, comparing the queue position of the selected work item with the numbers of work items for each of the plurality of successive time intervals to predict during which of the time intervals the selected work item will likely be serviced.

5. The method of claim 1, wherein the projected number is an average of the first and second numbers, wherein the first and other time intervals define a plurality of successive time intervals, each of the successive time intervals having a corresponding average number of work items serviced during the respective time interval, wherein the selected work item has a corresponding queue position, and wherein determining step (g) comprises:

adjusting at least some of the average numbers of work items for at least some of the successive time intervals to reflect at least one of increases and decreases in agent staffing levels during the at least some of the successive time intervals; and after the adjusting step, comparing the queue position of the selected work item with the numbers of work items for each of the plurality of successive time intervals to predict during which of the time intervals the selected work item will likely be serviced.

6. A computer readable medium comprising instructions that, if and when executed, causes the processor to perform the steps of claim 1 and wherein, during at least part of the first time interval, a plurality of human agents are servicing work items and wherein, during at last part of the second time interval, no human agents are servicing work items.

7. A logic circuit in communication with a processor, wherein, when the logic circuit is energized, the logic circuit necessarily performs the steps of claim 1 and wherein, during at least part of the first time interval, a first number of human agents are servicing work items, wherein, during at least part of the second time interval, a second number of human agents are servicing work items, and wherein the first and second numbers are different.

8. A method, comprising:

a processor determining two or more successive time intervals during a predetermined period of time, the predetermined period of time recurring cyclically;

the processor selecting the two or more successive time intervals;

the processor determining a number of work items serviced in a past occurrence of each of the two or more successive time intervals;

the processor determining, based on the number of work items, a number of work items likely to be serviced during a future occurrence of each of the two or more successive time intervals;

the processor creating a predicted service time table, the table comprising, for each future occurrence of each of the two or more successive time intervals, a corresponding number of work items likely to be serviced;

the processor retrieving a business time table, the business time table including a business staffing event;

the processor adjusting the number of work items likely to be serviced in the predicted service time table based on the business staffing event in the business time table;

the processor selecting an enqueued work item waiting to be serviced, the enqueued work item having a corresponding queue position; and the processor predicting using the adjusted predicted service time table, a selected time interval in which the selected work item will likely be serviced, the prediction being determined by the processor comparing a current queue position of a selected work item with the number of work items likely to be serviced in at least one of the future occurrences of the two or more successive time intervals.

9. The method of claim 8, wherein, during at least one of the future occurrences of the time intervals, the respective number of work items is zeroed based on the one or more business staffing events in the business time table and wherein the at least some of zeroed future occurrences of the time intervals are positioned between a selected time at which the selected work item is in the queue position and the predicted time interval.

10. The method of claim 8, wherein the step of determining the respective number of work items comprises:

(a) selecting a first time interval in the plurality of time intervals;

(b) determining a first number of work items serviced by the contact center during a first occurrence of the first time interval;

(c) determining a second number of work items serviced by the contact center during a second occurrence of the first time interval; and (d) determining, based on the first and second numbers of work items, an average number of work items serviced during the first time interval.

11. The method of claim 10, wherein the work items are non-real-time contacts, wherein the work items are serviced by human agents, wherein a first level of human agent staffing during the first time interval is different from a second level of human agent staffing during the second time interval, and wherein each of the first and second numbers of work items is nonzero.

12. The method of claim 10, wherein the selected work item is in a queue, wherein the first occurrence of the first time interval precedes the second occurrence of the first time interval, and wherein in the determining step (d) the average is determined using the following equation:

$$AWS_{NEW}=(X*AWS_{OLD})+((1-X)*WS_{SELECTED\ TIME\ INTERVAL})$$

where $AWS_{NEW}$ is a new average number of work items to be serviced during the first time interval, X is a weighting factor having a value less than or equal to one, $AWS_{OLD}$ is an old average number of work items to be serviced during the first time interval, and $WS_{SELECTED\ TIME\ INTERVAL}$ is the number of work items serviced during the second occurrence of the first time interval.

13. The method of claim 8, wherein each of the successive time intervals has a corresponding average number of work items serviced during the time interval, wherein the selected work item has a corresponding queue position, and wherein the adjusting step comprises:
adjusting at least some of the average numbers of work items for at least some of the successive time intervals to zero to reflect an idle contact center period in which no work items are serviced, the at least some of the successive time intervals falling within the idle contact period; and
after the adjusting step, comparing the queue position of the selected work item with the average numbers of work items for each of the plurality of successive time intervals to predict during which of the time intervals the selected work item will likely be serviced.

14. The method of claim 8, wherein each of the successive time intervals has a corresponding average number of work items serviced during the time interval, wherein the selected work item has a corresponding queue position, and wherein the adjusting predicting step comprises:
adjusting at least some of the average numbers of work items for at least some of the successive time intervals to reflect at least one of increases and decreases in agent staffing levels during the at least some of the successive time intervals; and
after the adjusting step, comparing the queue position of the selected work item with the average numbers of work items for each of the plurality of successive time intervals to predict during which of the time intervals the selected work item will likely be serviced.

15. A computer readable medium comprising instructions that, if and when executed, causes the processor to perform the steps of claim 10 and wherein, during at least part of the first time interval, a plurality of human agents are servicing work items and wherein, during at last part of the second time interval, no human agents are servicing work items.

16. A logic circuit in communication with a processor, wherein, when the logic circuit is energized, the logic circuit necessarily performs the steps of claim 10 and wherein, during at least part of the first time interval, a plurality of human agents are servicing work items and wherein, during at last part of the second time interval, no human agents are servicing work items.

17. A system, comprising:
a memory operable to store computer-executable instructions;
a processor in communication with the memory, the processor operable to read the computer-executable instructions from the memory and operable to execute the computer-executable instructions, wherein executing the computer-executable instructions causes the processor to execute:
a service time predictor operable to (a) select a first time interval, the first time interval occurring in a period of time, wherein the period of time recurs cyclically; (b) determine a first number of work items serviced by a contact center during a first occurrence of the first time interval; (c) determine a second number of work items serviced by the contact center during a second occurrence of the first time interval; (d) determine, based on the first and second numbers of work items, a projected number of work items serviced during a future occurrence of the first time interval; (e) repeat operations (a)-(d) with respect to a second time interval that is different from the first time interval in the period of time; (f) compare a future occurrence of a time interval with a future business staffing event; (g) adjust the projected number of work items likely to be completed in the future occurrence of the time interval; and (h) based on the projected number of work items to be serviced in the future occurrence of the first time interval and the second time interval, determine when a selected work item will be serviced.

18. The system of claim 17, wherein the projected number is an average of the first and second number of work items and wherein the work items are non-real-time contacts wherein the work items are serviced by human agents, wherein a first level of human agent staffing during the first time interval is different from a second level of human agent staffing during the second time interval, and wherein each of the first and second numbers of work items is nonzero.

19. The system of claim 17, wherein the projected number is an average of the first and second numbers, wherein the selected work item is in a queue, wherein the first occurrence of the first time interval precedes the second occurrence of the first time interval, and wherein in the determining operation (d) the average is performed by the predictor using the following equation:

$$AWS_{NEW}=(X*AWS_{OLD})+((1-X)*WS_{SELECTED\ TIME\ INTERVAL})$$

where $AWS_{NEW}$ is a new average number of work items to be serviced during the first time interval, X is a weighting factor having a value less than or equal to one, $AWS_{OLD}$ is an old average number of work items to be serviced during the first time interval, and $WS_{SELECTED\ TIME\ INTERVAL}$ is the number of work items serviced during the second occurrence of the first time interval.

20. The system of claim 17, wherein the projected number is an average of the first and second numbers, wherein the first and other time intervals define a plurality of successive time intervals, each of the successive time intervals having a corresponding average number of work items serviced during the respective time interval, wherein the selected work item has a corresponding queue position, and wherein the adjusting operation (g) includes the sub-operations of:
adjusting at least some of the average numbers of work items for at least some of the successive time intervals to zero to reflect an idle contact center period in which no work items are serviced, the at least some of the successive time intervals falling within the idle contact period; and
after the adjusting step, comparing the queue position of the selected work item with the numbers of work items for each of the plurality of successive time intervals to predict during which of the time intervals the selected work item will likely be serviced.

21. The system of claim 17, wherein the projected number is an average of the first and second numbers, wherein the first and other time intervals define a plurality of successive time intervals, each of the successive time intervals having a corresponding average number of work items serviced during the respective time interval, wherein the selected work item has a corresponding queue position, and wherein determining operation (g) comprises the sub-operations of:

adjusting at least some of the average numbers of work items for at least some of the successive time intervals to reflect at least one of increases and decreases in agent staffing levels during the at least some of the successive time intervals; and after the adjusting step, comparing the queue position of the selected work item with the numbers of work items for each of the plurality of successive time intervals to predict during which of the time intervals the selected work item will likely be serviced.

22. A system, comprising:

a memory operable to store computer-executable instructions;

a processor in communication with the memory, the processor operable to read the computer-executable instructions from the memory and operable to execute the computer-executable instructions, wherein executing the computer-executable instructions causes the processor to execute:

a service time predictor operable to (a) select a plurality of successive time intervals, each of the plurality of successive time intervals occurring during a cyclical period of time; (b) determine a respective number of work items serviced in a past occurrence of each time interval; (c) determine, based on the numbers of work items, a number of work items likely to be serviced during a future occurrence of each of the successive time intervals; (d) create a predicted service time table, the table comprising, for each future occurrence of each successive time interval, a corresponding number of work items likely to be serviced; (e) retrieve a business time table, the business time table including a business staffing event; (f) adjust the number of work items likely to be serviced in the predicted service time table based on the business staffing event in the business time table; (g) select an enqueued work item waiting to be serviced, the enqueued work item having a corresponding queue position; and (h) predict, using the predicted service time table, a selected time interval of the plurality of successive time intervals in which the selected work item will likely be serviced, the prediction being determined by the processor comparing a current queue position of a selected work item with the number of work items likely to be serviced in at least some of the successive time intervals.

23. The system of claim 22, wherein, during at least one of the future occurrences of the time intervals, the respective number of work items is zeroed based on the one or more business staffing events in the business time table and wherein the at least some of zeroed future occurrences of the time intervals are positioned between a selected time at which the selected work item is in the queue position and the predicted time interval.

24. The system of claim 22, wherein the determining operation of determining the respective number of work items comprises the sub-operations of:

(a) selecting a first time interval in the plurality of time intervals;

(b) determining a first number of work items serviced by the contact center during a first occurrence of the first time interval;

(c) determining a second number of work items serviced by the contact center during a second occurrence of the first time interval; and (d) determining, based on the first and second numbers of work items, an average number of work items serviced during the first time interval.

25. The system of claim 24, wherein the work items are non-real-time contacts, wherein the work items are serviced by human agents, wherein a first level of human agent staffing during the first time interval is different from a second level of human agent staffing during the second time interval, and wherein each of the first and second numbers of work items is nonzero.

26. The system of claim 24, wherein the selected work item is in a queue, wherein the first occurrence of the first time interval precedes the second occurrence of the first time interval, and wherein in the determining sub-operation (d) the average is determined by the predictor using the following equation:

$$AWS_{NEW} = (X * AWS_{OLD}) + ((1-X) * WS_{SELECTED\ TIME\ INTERVAL})$$

where $AWS_{NEW}$ is a new average number of work items to be serviced during the first time interval, X is a weighting factor having a value less than or equal to one, $AWS_{OLD}$ is an old average number of work items to be serviced during the first time interval, and $WS_{SELECTED\ TIME\ INTERVAL}$ is the number of work items serviced during the second occurrence of the first time interval.

27. The system of claim 22, wherein each of the successive time intervals has a corresponding average number of work items serviced during the time interval, wherein the selected work item has a corresponding queue position, and wherein the adjusting operation comprises the sub-operations of:

adjusting at least some of the average numbers of work items for at least some of the successive time intervals to zero to reflect an idle contact center period in which no work items are serviced, the at least some of the successive time intervals falling within the idle contact period; and after the adjusting step, comparing the queue position of the selected work item with the average numbers of work items for each of the plurality of successive time intervals to predict during which of the time intervals the selected work item will likely be serviced.

28. The system of claim 22, wherein each of the successive time intervals has a corresponding average number of work items serviced during the time interval, wherein the selected work item has a corresponding queue position, and wherein the adjusting operation comprises the sub-operations of:

adjusting at least some of the average numbers of work items for at least some of the successive time intervals to reflect at least one of increases and decreases in agent staffing levels during the at least some of the successive time intervals; and after the adjusting step, comparing the queue position of the selected work item with the average numbers of work items for each of the plurality of successive time intervals to predict during which of the time intervals the selected work item will likely be serviced.

\* \* \* \* \*